Figures 1, 2, 3:
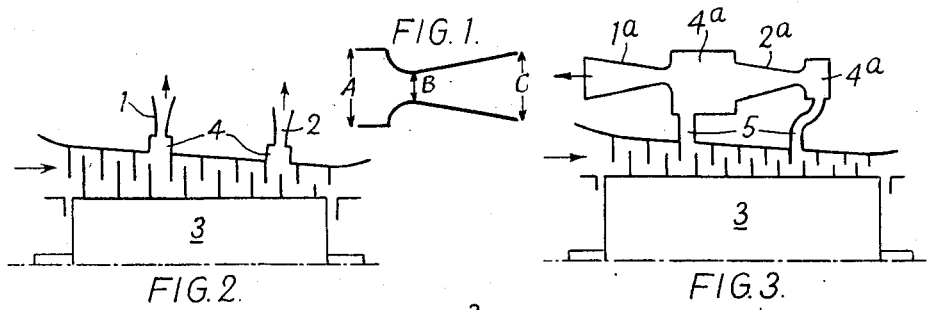

Aug. 29, 1950     D. MacL. SMITH     2,520,697
INTERNAL-COMBUSTION TURBINE PLANT
Filed Feb. 27, 1945

Inventor
David MacLeish Smith
By Norris L. Otterman
Attorneys

Patented Aug. 29, 1950

2,520,697

UNITED STATES PATENT OFFICE 2,520,697

INTERNAL-COMBUSTION TURBINE PLANT

David MacLeish Smith, Stretford, Manchester, England, assignor to Metropolitan-Vickers Electrical Company Limited, London, England, a company of Great Britain Application February 27, 1945, Serial No. 580,026
In Great Britain October 11, 1943

Section 1, Public Law 690, August 8, 1946
Patent expires October 11, 1963

12 Claims. (Cl. 230—122)

This invention relates to multi-stage axial flow air or gas compressors, more particularly but not exclusively when forming or adapted to form part of internal combustion turbine plant, sometimes called gas turbine plant, wherein the turbine drives the compressor either directly or through gearing, so that the speed of the compressor is always the same as, or is in direct relation to that of the turbine. The compressor comprises low and high pressure parts, each having a plurality of blading stages, and delivers to a combustion chamber from which the products of combustion are fed to the turbine.

With axial flow compressors it is in some cases desirable to provide means for blowing off air from an intermediate stage of the compressor, as is desirable during starting up of the plant, in order to avoid stalling of the compressor during the conditions which obtain during starting up.

In the prior application of Karl Baumann, Serial No. 518,175, filed January 13, 1944, now Patent No. 2,418,801, dated April 8, 1947, the blowing-off of the air is effected automatically by centrifugally operated valves which are normally biased to the open position and which commence to close by centrifugal action as the speed reaches a predetermined value, and the valves remain closed at high speeds. Alternatively, the blow-off could be achieved by the use of pressure-operated relief valves arranged to close as the pressure reaches a predetermined value. For a more complete explanation of the need for the aforesaid blowing-off of the air reference is made to the abovementioned earlier application.

According to the present invention the same or similar results are achieved, with the omission of, or in addition to, centrifugally-operated valves or relief valves by taking advantage of the flow characteristics peculiar to divergent nozzles, whereby the proportion of air blown off is diminished as the pressure ratio increases.

It is, of course, per se well known that a divergent nozzle, whereof the diffuser acts efficiently, gives, under very low pressure differences, a flow approaching that which would be obtained through a simple nozzle of diameter the same as that of the discharge end of the divergent nozzle. Critical flow, however, is reached in the case of a divergent nozzle at the throat thereof for pressure ratios considerably lower than the critical pressure ratio of a simple nozzle. Thus the ratio of flow under a given low pressure ratio to flow under a given high pressure ratio is much greater in the case of a divergent nozzle than in the case of a simple nozzle. Thus, in other words, in the case of gas discharging through a simple nozzle, the rate of discharge increases as the ratio of inlet to outlet pressure increases until the critical ratio is reached, after which there is no appreciable increase of rate of discharge. Thus in the case of gas discharging through a divergent nozzle when the ratio of pressures is small the discharge is substantially controlled by the diameter of the discharge end of the divergent nozzle, whilst at a greater pressure ratio the critical velocity is reached at the throat so that the rate of flow is thereby limited, whilst the ratio of pressures at the inlet and outlet ends of the nozzle when the condition arises is less than the critical pressure ratio for a simple nozzle.

Thus the result of the use, in accordance with the present invention, of one or more divergent nozzles attached to an intermediate stage or stages of the compressor is that the proportion of total air blown off decreases as the pressure ratio or the speed of the compressor increases, but the rate of such decrease will commence to rise rapidly in the case of a divergent nozzle at a lower pressure ratio than would be the case with a simple nozzle.

Thus a plurality of divergent nozzles projecting radially, or bent to project rearwardly with respect to the direction of motion of the compressor axis, may be provided in circular distribution around the outer casing of the compressor, or connected by the throat and diffuser portion to an annular header. If the blow-off nozzles are provided at two stages of the compressor the nozzles of an earlier stage can be arranged in series with those of a later stage in such manner than when a given pressure ratio is reached flow is stopped through the tapping holes or belts except that at the highest pressure. In such case the pressure drop across the nozzle between two intermediate stages becomes equal to the difference in pressure between the two stages thus tapped.

Instead of the divergent blow-off nozzles being associated with the outer casing of the compressor they, or one, may be arranged inside the rotor, or, in the case of contra-rotational compressors, inside the inner rotor, and the rotor or inner rotor may have associated with it a reverse centrifugal compressor stage which feeds the nozzle, conveniently axially arranged within the compressor, from the axial flow blow-off stage. The reverse compressor takes the form of radial vanes by which swirl is removed. A portion of the air so taken off may be diverted to provide cooling for the bearings of the compressor. The air passing through the divergent nozzle may with advantage be led to the entry of the first stage.

Figure 4:
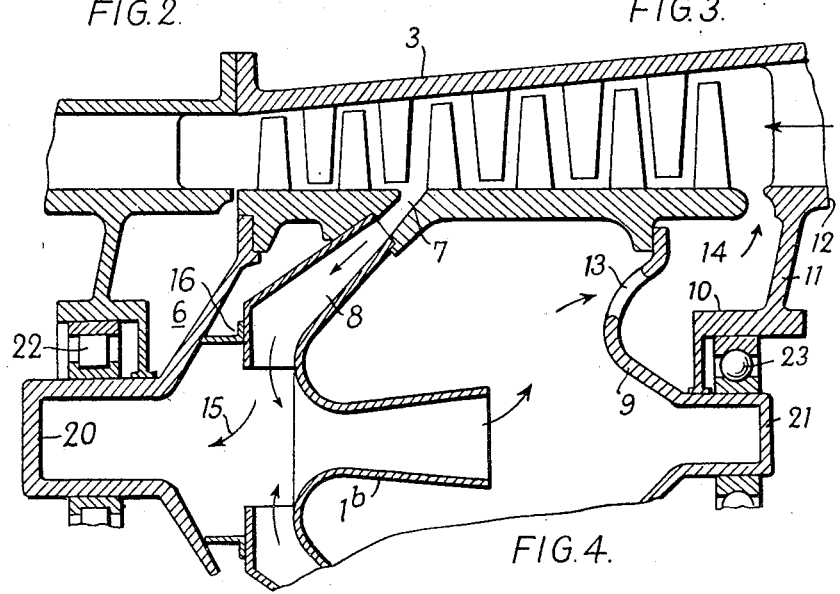
Figure 5:
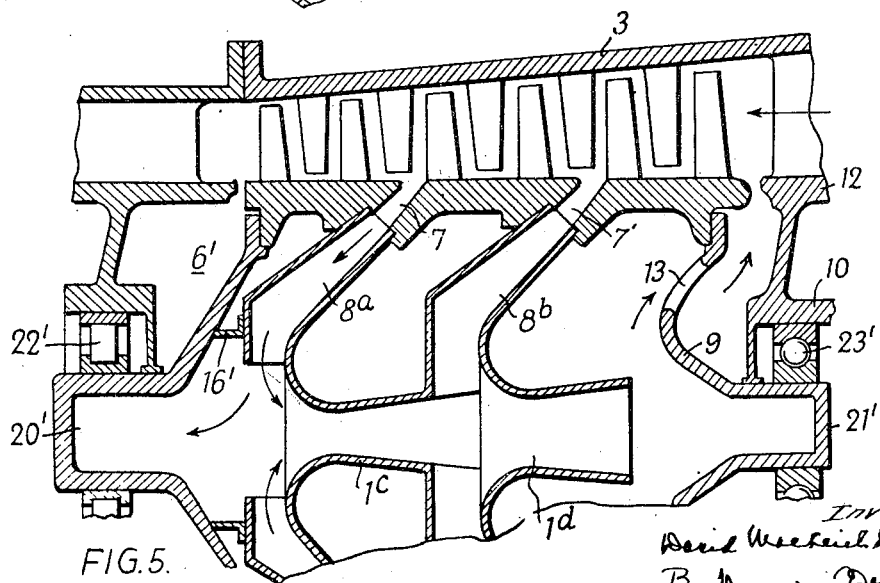

To enable the invention to be understood in greater detail it will now be described with reference to the accompanying drawings, in which Fig. 1 is a sectional diagram of a divergent nozzle, and Figs. 2 and 3 are sectional half-elevations in purely diagrammatic form and Figs. 4 and 5 are sectional views of four embodiments of the invention by way of example.

A full explanation of the divergent nozzle has been given in the preamble of this specification so that it is only necessary now to indicate, with respect to Fig. 1, that A is the inlet to the nozzle, B the throat and C the outlet end of the nozzle, whilst the direction of gas-flow is indicated by the arrow.

In Fig. 2 are shown the means for blowing off air comprising two divergent nozzles 1 and 2 of the kind shown in Fig. 1, located at different stages of the compressor shown generally at 3 and members 4 which may either be in the form of radial cylinders mounted over tapping holes in the outer fixed casing of the compressor or the members 4 may be annular channels, or sometimes called manifolds, having circumferentially arranged around each of them a plurality of the throated nozzles proper.

Fig. 3 illustrates the arrangement set forth in the preamble where the means for blowing off air comprises two divergent nozzles 1a and 2a arranged in series, chest members 4a (which may be annular), and tapping holes or passages in the fixed outer casing connected to the compressor by the pipes or annular ducts 5 and connected to deliver the blown off air to the respective chest members 4a.

In Fig. 4 the means for blowing off air comprises a single divergent blow-off nozzle 1b arranged interiorly of and coaxially with the rotor of the compressors or, if the compressor is a contrarotational one, it is arranged in the inner rotor, the diagrammatic Fig. 4 illustrating either case, a passage 7 leading from an intermediate compressor stage, and a reversed centrifugal compressor stage 6. The rotor (or inner rotor) is mounted rotatably by shafts 20 and 21 supported in bearings 22 and 23 and has associated with it the reversed centrifugal compressor stage 6 which feeds the nozzle 1b, which is conveniently axially arranged as shown. It will be seen that the air blown off passes through the passages or annular passage 7 to the reverse compressor 6. The latter may have radial blades 8 at its inner portion which remove swirl from the air.

In Fig. 4 the rotor or inner rotor is shown as being supported by a "swan-neck" disc 9 from the shaft 21, and at 10 is indicated the bearing housing supported by a disc 11 from a fixed inlet casing portion 12 of the compressor 3. Part of the air leaving the nozzle 1b may flow through the inner part of the member 9 for effecting cooling of the compressor bearing 10, while further air from the nozzle 1b may pass through holes 13 in the "swan-neck" member 9 to cool the outer surface of the compressor bearing 23 and also to flow as indicated by the arrow 14 into the inlet end of the illustrated compressor stage 3.

Furthermore some of the air from the reverse compressor 6, as indicated by the arrow 15 may flow, such as through a duct indicated at 16 to cool the bearing 22 of the compressor.

Fig. 5 shows a modification of the structure shown in Fig. 4, wherein the means for blowing off air comprises passages 7 and 7' leading from different intermediate compressor stages, a reversed centrifugal compressor 6' embodying a pair of radially bladed members 8a and 8b which receive the air blown off from different intermediate compressor stages through the passages 7 and 7' respectively, and a pair of divergent nozzles 1c and 1d, these nozzles receiving the air from the respective bladed members 8a and 8b and the nozzle 1c discharging air into the nozzle 1d, and the latter nozzle discharging air through the hole 13 to the inlet end of the compressor. The bladed members 8a and 8b and the divergent nozzles associated therewith are arranged interiorly of and coaxially with the compressor rotor which is mounted rotatably on shafts 20' and 21' supported in bearings 22' and 23'.

What I claim as new and desire to secure by Letters Patent of the United States is:

1. A multi-stage axial flow air compressor having relatively rotatable bladed members providing low, high and intermediate compressor stages for the flow of air axially between them, one of said members having a passage leading from different points around at least one intermediate compressor stage, and at least one divergent nozzle connected to said passage to receive air therefrom and to discharge at least a portion of such air to the atmosphere, said nozzle having a rate of flow which is controlled by the diameter of its outlet end while the inlet to outlet pressure ratio is relatively small and which rate of flow is controlled by the throat of the nozzle while said pressure ratio is relatively large.

2. A multi-stage axial flow air compressor having relatively rotatable bladed members providing low, high and intermediate compressor stages for the flow of air axially between them, an annular channel connected to at least one intermediate compressor stage at different points around said stage, and at least one divergent nozzle connected to said channel to receive air therefrom, said nozzle having a rate of flow which is controlled by the diameter of its outlet end while the inlet to outlet pressure ratio is relatively small and which rate of flow is controlled by the throat of the nozzle while said pressure ratio is relatively large.

3. A multi-stage axial flow air compressor having inner and outer relatively rotatable bladed members, and tapping holes in one of said members at different points around the circumference of at least one intermediate compressor stage for withdrawing air from such stage, an annular channel connecting said holes to receive blown off air therefrom, and at least one divergent nozzle connected to said channel to receive air therefrom, said nozzle having a rate of flow which is controlled by the diameter of its outlet end while the inlet to outlet pressure ratio is relatively small and which rate of flow is controlled by the throat of the nozzle while said pressure ratio is relatively large.

4. A multi-stage axial flow air compressor having relatively rotatable bladed members for the axial flow of air between them and providing low, high and intermediate compressor stages, passages leading from different intermediate compressor stages for blowing off air therefrom, and means comprising divergent nozzles connected to receive the air blown off from the respective intermediate stages through said passages and to discharge a portion at least of such air to the atmosphere.

5. A multi-stage axial flow air compressor as defined in claim 4, wherein said nozzles are individual to the respective passages and discharge separately to the atmosphere.

6. A multi-stage axial flow air compressor as defined in claim 4, wherein said nozzles are connected in series.

7. A multi-stage axial flow compressor comprising inner and outer bladed members having means for supporting them for relative rotation and forming between them low, high and intermediate compressor stages for the axial flow of air, and a divergent nozzle arranged interiorly of the inner member and coaxially therewith and having means for connecting it to at least one intermediate compressor stage for blowing off air therefrom.

8. A multi-stage axial flow compressor comprising inner and outer bladed members having means for supporting them for relative rotation and forming between them low, high and intermediate compressor stages for the axial flow of air, a reverse centrifugal compressor stage within the inner member and connected to at least one intermediate compressor stage, and a divergent nozzle arranged interiorly of and coaxially with the inner member and connected to the reverse compressor to receive fluid therefrom.

9. A multi-stage axial flow air compressor comprising inner and outer bladed members having means for supporting them for relative rotation and forming between them low, high and intermediate compressor stages for the axial flow of air, a reverse centrifugal compressor stage connected to at least one intermediate compressor stage to receive air blown off therefrom, a divergent nozzle arranged interiorly of the inner member coaxially therewith and connected to the reverse compressor stage to receive blown off air therefrom, and means for directing a portion at least of such air to the inlet end of a low pressure stage of the compressor.

10. A multi-stage axial flow compressor comprising inner and outer bladed members forming between them low, high and intermediate compressor stages for the axial flow of air, means including a bearing for rotatably supporting the inner member, a reverse centrifugal compressor stage connected to at least one intermediate compressor stage to receive air blown off therefrom, a divergent nozzle interiorly of the inner member connected to receive air from the reverse compressor stage, and means for directing air from the nozzle to said bearing for cooling it.

11. A multi-stage axial flow air compressor comprising inner and outer bladed members having means for supporting them for relative rotation and forming between them low, high and intermediate compressor stages for the axial flow of air, a reverse centrifugal compressor stage within and coaxial with the inner member and connected to receive air from at least one intermediate compressor stage, and a divergent nozzle having its inlet connected to said reverse centrifugal compressor.

12. A multi-stage axial flow air compressor comprising inner and outer bladed members having means for supporting them for relative rotation and forming between them low, high and intermediate compressor stages for the axial flow of air, a divergent nozzle arranged interiorly of the inner member and coaxially therewith, and a reverse centrifugal compressor stage interiorly of and coaxial with the inner member and connected to receive air from at least one intermediate compressor stage and to feed such air to the nozzle.

DAVID MacLEISH SMITH.

REFERENCES CITED

The following references are of record in the file of this patent:

UNITED STATES PATENTS

| Number | Name | Date |
|---|---|---|
| 1,111,498 | Rotter | Sept. 22, 1914 |
| 1,263,056 | Graemiger | Apr. 16, 1918 |
| 1,796,053 | Schmidt | Mar. 10, 1931 |
| 2,099,699 | Meininghaus | Nov. 23, 1937 |
| 2,314,058 | Stalker | Mar. 16, 1943 |
| 2,321,276 | DeBolt | June 8, 1943 |
| 2,344,835 | Stalker | Mar. 21, 1944 |
| 2,418,801 | Baumann | Apr. 8, 1947 |

FOREIGN PATENTS

| Number | Country | Date |
|---|---|---|
| 504,214 | Great Britain | Apr. 21, 1939 |